(12) United States Patent
Fitzpatrick et al.

(10) Patent No.: US 8,046,290 B2
(45) Date of Patent: Oct. 25, 2011

(54) IOI-BASED BLOCK TRADING SYSTEMS, METHODS, INTERFACES, AND SOFTWARE

(76) Inventors: Daniel R. Fitzpatrick, Summit, NJ (US); Daniel Geoffrey Kramer, Manchester, MA (US); Robert Manuel Moitoso, Marshfield, MA (US); James Worden Toffey, Summit, NJ (US)

(*) Notice: Subject to any disclaimer, the term of this patent is extended or adjusted under 35 U.S.C. 154(b) by 276 days.

(21) Appl. No.: 11/540,501

(22) Filed: Sep. 29, 2006

(65) Prior Publication Data

US 2007/0192227 A1 Aug. 16, 2007

Related U.S. Application Data

(60) Provisional application No. 60/721,747, filed on Sep. 29, 2005.

(51) Int. Cl.
*G06Q 40/00* (2006.01)
(52) U.S. Cl. .................... 705/37; 705/35; 705/36 R
(58) Field of Classification Search .................. 705/37, 705/36 R, 35, 38, 80, 26, 7, 7.31, 7.36, 7.11, 705/7.28; 382/128
See application file for complete search history.

(56) References Cited

U.S. PATENT DOCUMENTS

| | | | |
|---|---|---|---|
| 3,865,380 A * | 2/1975 | Thomas | 273/256 |
| 5,101,353 A | 3/1992 | Lupien et al. | |
| 6,347,307 B1 | 2/2002 | Sandhu et al. | |
| 6,421,653 B1 * | 7/2002 | May | 705/36 R |
| 6,993,511 B2 * | 1/2006 | Himmelstein | 705/35 |
| 7,356,500 B1 | 4/2008 | Waelbroeck et al. | |
| 2002/0052824 A1 | 5/2002 | Mahanti et al. | |
| 2002/0055901 A1 | 5/2002 | Gianakouros et al. | |
| 2002/0091621 A1 | 7/2002 | Conklin et al. | |
| 2002/0099645 A1 | 7/2002 | Agarwal et al. | |
| 2002/0099646 A1 | 7/2002 | Agarwal et al. | |
| 2002/0128945 A1 | 9/2002 | Moss et al. | |
| 2002/0128955 A1 | 9/2002 | Brady et al. | |
| 2003/0009421 A1 | 1/2003 | Bansal et al. | |

(Continued)

FOREIGN PATENT DOCUMENTS

WO  WO-2007/041220 A2  4/2007

(Continued)

OTHER PUBLICATIONS

Mills, Michael "Compliance Clarified Selling IPOs Over the 'Net. (Brief Article)" Jul. 5, 1999, Compliance Reporter , 6 , 14 , 10.*

(Continued)

*Primary Examiner* — Kelly Campen
(74) *Attorney, Agent, or Firm* — Stroock & Stroock & Lavan LLP

(57) ABSTRACT

In the financial-services industry, there are online centers that help brokers to match sellers and buyers of stock based on indications of interest (IOIs). However, at least some of these centers are not only limited in the types of IOIs that they provide, but also in the ways how they allow IOI senders to control IOI usage. Accordingly, to facilitate trades, one exemplary system provides an IOI which is associated with an online negotiation capability. Some versions of this system provide mechanisms for users, such as broker-dealers, to define different IOI response privileges for recipients of their IOIs. To reduce the market risks of failed negotiations, some versions provide automated features for comparing confidential information from traders and initiating online negotiations for stock transactions contingent on favorable comparisons.

7 Claims, 9 Drawing Sheets

U.S. PATENT DOCUMENTS

| | | |
|---|---|---|
| 2003/0033212 A1 | 2/2003 | Sandhu et al. |
| 2004/0034591 A1 | 2/2004 | Waelbroeck et al. |
| 2004/0059666 A1 | 3/2004 | Waelbroeck et al. |
| 2004/0064420 A1 | 4/2004 | Buist |
| 2004/0138957 A1 | 7/2004 | Bartolini et al. |
| 2004/0143540 A1 | 7/2004 | Song |
| 2004/0172356 A1 | 9/2004 | Agarwal et al. |
| 2004/0209596 A1* | 10/2004 | Wong et al. .................. 455/405 |
| 2005/0021445 A1 | 1/2005 | Caro |
| 2005/0131797 A1 | 6/2005 | Ananthanarayanan et al. |
| 2008/0306864 A1 | 12/2008 | Foley et al. |

FOREIGN PATENT DOCUMENTS

| | | | |
|---|---|---|---|
| WO | WO-2007041220 A3 | 4/2007 | |

OTHER PUBLICATIONS

Anonymous"SolutionForge launches 'FIX.NET Trader' to make order management more accessible to sell-side;Full-featured, FIX-compliant Order Management System brings advantagesof automated order management to small to medium-sized sell-side firmsFIX.NETTrader addresses calls from buy-side for the sell-side to embrace FIX-enabled trading"Jun. 18, 2003,M2PRE.*

"Application Serial No. PCT/US06/37857, International Search Report mailed Nov. 29, 2007", 7 pgs.

"Application Serial No. PCT/US06/37857, Written Opinion mailed Nov. 29, 2007", 11 pgs.

"NYFIX®—NYFIX Natural", [online]. © 2006 NYFIX Inc. [archived Jul. 21, 2006]. Retrieved from the Internet: <URL: http://web.archive.org/web/20060721050620/http://www.nyfix.com/buyside-solutions/transaction-services/nyfix-natural>, 1 pg.

"Indii.communications Home Page", [online]. [archived on Jun. 4, 2001]. Retrieved from the Internet: <URL: http://web.archive.org/web/20010604120607/http://www.indii.com/index.html>, 13 pgs.

"Indii.Communications Home Page", [online]. [archived on May 29, 2002]. Retrieved from the Internet: <URL: http://web.archive.org/web/20020529135230/http://www.indii.com/>, 13 pgs.

"Indii.Communications Home Page", [online]. [archived on Sep. 7, 2003]. Retrieved from the Internet: <URL: http://web.archive.org/web/20030907070442/http://www.indii.com/index.html>, 11 pgs.

"Indii.Communications Home Page", [online]. [retrieved on Apr. 2, 2004]. Retrieved from the Internet: <URL: http://web.archive.org/web/20040402015803/http://www.indii.com/index.html>, 13 pgs.

"Indii.Communications Home Page", [online]. [archived on Apr. 28, 2004]. Retrieved from the Internet: <URL: http://web.archive.org/web/20040428200642/http://www.indii.com/>, 13 pgs.

"Indii.Communications Home Page", [online]. [archived on Sep. 18, 2004]. Retrieved from the Internet: <URL: http://web.archive.org/web/20040918033105/http://www.indii.com/>, 16 pgs.

"Indii.Communications Home Page", [online]. [archived on Oct. 16, 2004]. Retrieved from the Internet: <URL: http://web.archive.org/web/20041016134223/http://www.indii.com/index.html>, 16 pgs.

"Indii.Communications Home Page", [online]. [archived on Oct. 31, 2005]. Retrieved from the Internet: <URL: http://www.indii.com>, 21 pgs.

Atwell, S., et al., "Financial Information Exchange Protocol (FIX)", *FIXML 4.4 Schema Version Guide*, Version 4.4 Schema, (Jan. 9, 2004), 1-51.

"U.S. Appl. No. 11/239,663, Non-Final Office Action mailed Mar. 18, 2008", 21 pgs.

"U.S. Appl. No. 11/239,663, Non-Final Office Action mailed Dec. 24, 2008", 14 pgs.

"U.S. Appl. No. 11/239,663, Response filed Sep. 18, 2008 to Non Final Office Action mailed Mar. 18, 2008", 12 pgs.

"U.S. Appl. No. 11/239,663, Final Office Action Mailed Sep. 4, 2009", 25 pgs.

* cited by examiner

FIG. 4

TRADEWEB v W6.20NS STG
FILE BOOKMARK COMPOSITE DEALERS ANALYTICS SECLIST MSG ADMIN WINDOWS HELP

STG2    LK UP   1 SEC   ONE SEC      ZCAUTH
ENABLE ABC ASSOCIATES NEW YORK CUSTOMERS    IFR   AXE IT

PRODUCT [TBT ▽]    COMPANY ACRONYM [ABC ASSOCIATES YEW YORK]——410

FILTER BY [LOGON ID]   430   [A][B][C][D][E][F][G][H][I][J][K][L][M][N][O][P][Q][R][S][T][U][V][W][X][Y][Z]   PAGE 1 OF 2

420

| LOGON ID | CUSTOMER NAME | TBT | ANON | WL | | | INFO | | SALES |
|---|---|---|---|---|---|---|---|---|---|
| QMARSH | MARSH, GWEN | YES | YES | YES | | | | | <NONE> |
| ISMITH | SMITH, ISAAC | YES | YES | YES | | | | | <NONE> |
| GCARLY | CARLY, GLEN | NO | NO | NO | | | | | <NONE> |
| DFRANK | FRANK, DAVE | YES | YES | YES | | | | | <NONE> |
| BHARK | HARKINS, BRIAN | YES | YES | YES | | | | | <NONE> |
| TJONES | JONES, TIM | NO | NO | NO | | | | | <NONE> |
| EZARB | ZARB, ED | YES | YES | YES | | | | | <NONE> |
| | | | 440 | | | | | | <NONE> |
| | | | | | | | | | <NONE> |
| | | | | | | | | | <NONE> |

CONFIGURE    PG UP   PG DN

TRADE LIST   REFRESH     CANCEL   UPDATE

[<] [>] [MAIN][TRSY][AGCY][MBS][EUGV][GILT][PFAN][CP][CAN][ADN][SUPR][CORP] [>>]

IOI-BASED BLOCK TRADING SYSTEMS, METHODS, INTERFACES, AND SOFTWARE

RELATED APPLICATION

This application claims priority to U.S. Provisional Application 60/721,747, which was filed Sep. 29, 2005 and which is incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2005, Thomson Financial, Inc.

BACKGROUND

The 1990s witnessed a rapid proliferation of computer technology into homes and businesses. During this time, computers, fueled by growth of the much-heralded Internet, advanced from facilitating tasks, such as word processing and bookkeeping, to become everyday communications tools, fast approaching the commonness of telephones and televisions. As a result, virtually every sector of public, private, and commercial life has been affected in some way by the power and reach of today's computer technology.

The financial-services industry, for example, has recently seen not only the emergence of Internet-based trading platforms that allow online trading of stocks, bonds, and commodities, but also the emergence of online listing centers that allow broker-dealers—individuals or firms in the business of buying and selling securities for themselves and others—to match sellers with buyers of securities based on listed indications of interest" (IOIs). A seminal example of such an online center is the AutEx™ service from Thomson Financial of New York, N.Y.

This service provides a secure and convenient means for broker-dealers to broadcast their desires, or interests, in purchasing or selling blocks of particular stock to a select group of securities traders, generally known collectively as buy-side traders. (Block trades are typically defined as trades of at least 10,000 shares or trades with a total market value of at least $200,000.) For example, the AutEx system provides three types of IOIs: 1) a general IOI which identifies a stock and a general number of shares, such as large, medium or small; 2) a super IOI which identifies a stock, a specific number of shares, and price; and 3) a natural IOI which not only identifies a stock, a specific number of shares, and a price, but also signals existence of an active customer order for the stock.

A buy-side trader viewing these IOIs in an online list can then select an IOI for a stock and create a placeholder trade ticket in her order management system, with the ticket order including information from the IOI. Next, the buy-side trader contacts the IOI sender via a separate telephone, email, or instant messaging system to discuss a potential trade. If agreement is reached, the buy-side trader manually edits the placebolder trade ticket (in their buy-side Order Management System (OMS)) to conform to the terms and electronically sends the agreed on trade terms to the dealer trading system. The dealer then proceeds to execute the trade, reporting the transaction to the public market place and returning resulting execution reports to the buy-side OMS.

Although the AutEx system is quite successful, the present inventors have recognized that it is limited in at least two ways. First, it forces users to exit the system to negotiate and to complete trades based on IOIs. This exiting is not only cumbersome and time consuming, but in fast-moving markets can result in lost trading or profit opportunities. Second, conventional systems, such as the AutEx system, provide few options for IOI senders to control usage of their IOIs. For example, a sender can define an IOI, its duration, and its recipients, but cannot offer one set of recipients different IOI response options than another.

Accordingly, the present inventors have recognized a need for better ways of using IOIs to facilitate trading.

SUMMARY

To address this and/or other needs, the present inventors devised, among other things, systems, methods, interfaces, and software that enhance the ability of financial-information systems, such as the AutEx system, to facilitate trades. One exemplary financial-information system provides indications of interest (IOIs) which are associated with an online negotiation mechanism that is automatically invoked with selection of the IOIs.

The exemplary system also includes entitlement features that allow IOI senders to provide preferential treatment to select IOI recipients. For example, one feature allows IOI senders to define which, if any, recipients of their IOIs can or cannot access an IOI having the associated online negotiation mechanism. Another allows IOI senders to define which recipients can respond anonymously to IOIs. Anonymity is particularly valuable for recipients who want the freedom to negotiate a trade without the risk of having divulged their identity if the negotiations fail.

Yet another feature allows IOI senders to define which recipients have access to an online mechanism that not only enables traders to confidentially signal their desire to trade a larger quantity of a given stock (that is, to "work larger"), but initiates online negotiations for a larger quantity of the stock only if the system determines that their desires are compatible. Like the anonymity feature, this feature allows traders to avoid sharing information with traders who have no interest in completing the desired transaction and to therefore reduce the risk of triggering adverse market reactions.

Ultimately, one of more of these or other disclosed embodiments and/or features promise improved efficiency, convenience, and confidentiality in communications and transactions between stock traders, particularly broker-dealers and buy-side traders.

BRIEF DESCRIPTION OF DRAWINGS

FIG. 4 is a facsimile of exemplary graphical user interface 400 corresponding to one or more embodiments of the present invention.

FIG. 5 is a facsimile of exemplary graphical user interface 500 corresponding to one or more embodiments of the present invention.

FIG. 9 is a facsimile of exemplary graphical user interface 900 corresponding to one or more embodiments of the present invention

DETAILED DESCRIPTION OF EXEMPLARY EMBODIMENTS

The following description, which incorporates the figures and the appended claims, describes and/or illustrates one or more exemplary embodiments of one or more inventions. These embodiments, offered not to limit but only to exemplify and teach the invention(s), are shown and described in sufficient detail to enable those skilled in the art to make and use the invention(s). Thus, where appropriate to avoid obscuring the one or more inventions, the description may omit certain information known to those of skill in the relevant art.

Exemplary Financial-Information System

Figure 1:
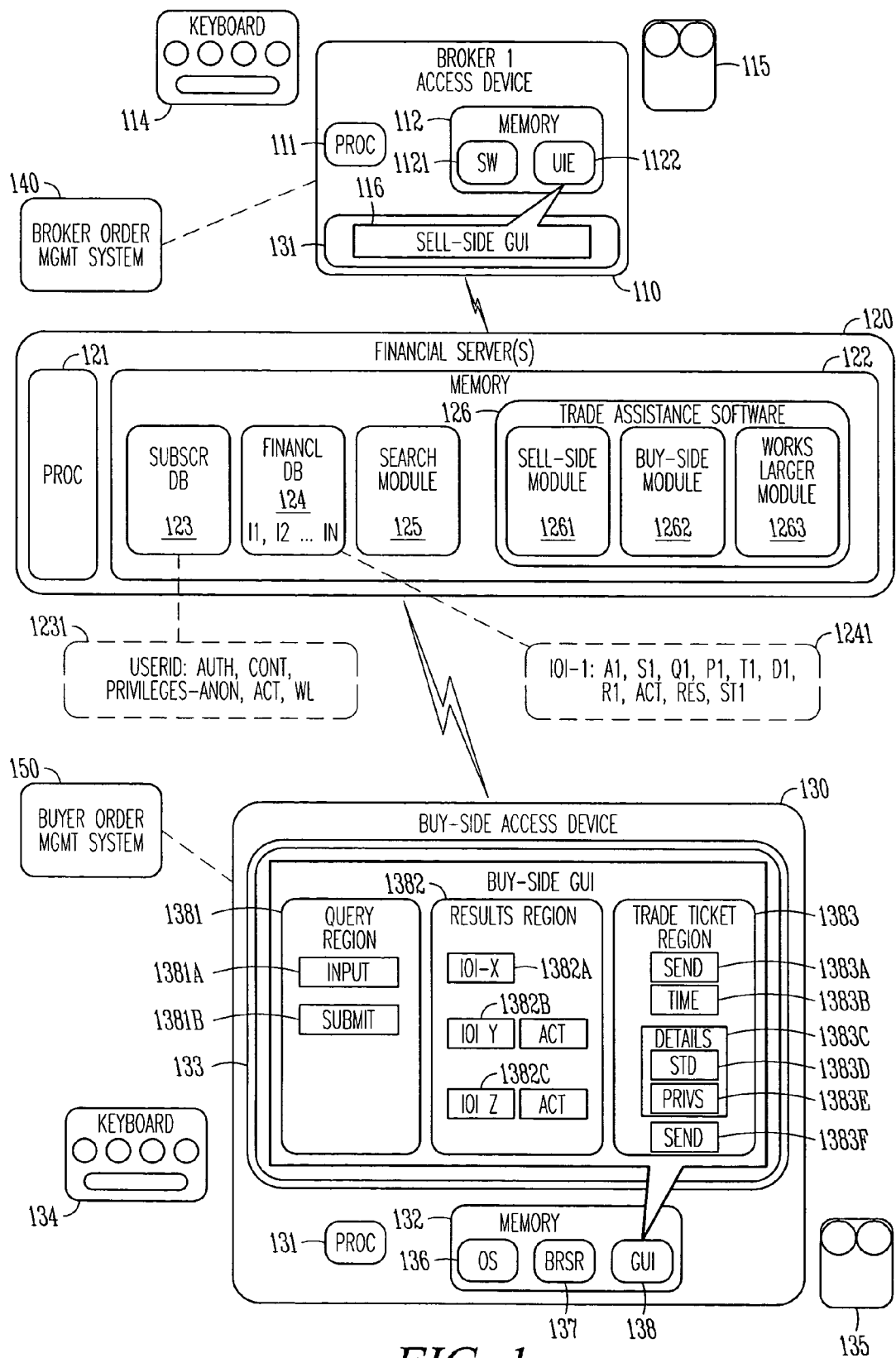
FIG. 1 is a block diagram of an exemplary financial-information system 100 corresponding to one or more embodiments of the present invention.

FIG. 1 depicts an exemplary financial-information system 100 that corresponds to one or more embodiments of the present invention. System 100 includes sell-side access device 110, a financial server 120, one or more buy-side access devices 130, a sell-side order management system 140, and a buy-side order management system 150.

Sell-Side Access Devices

Specifically, sell-side access device 110, which is generally representative of though not necessarily identical to other sell-side devices not shown, takes the exemplary form of a personal computer, workstation, personal digital assistant, mobile telephone, or any other device capable of providing an effective user interface with a server or database via wireline or wireless communication link, such as a local-, wide-, private-, or virtual-private network.

More specifically, access device 110 includes a processor module 111, a memory 112, a display 113, a keyboard (or keypad) 114, and a graphical pointer or selector 115. Processor module 111 includes one or more processors, controllers, or processing circuits. Memory 112 includes software 1121, such as an operating system and/or browser, and a set of one or more user-interface elements (UIEs) 1122. Software 1121 and UIEs 1122 together define a graphical user interface 116 that works in conjunction with keyboard 114 and selector 115. One or portions of interface 116 enable users to not only define and transmit novel indications of interest (IOI) data structures (described below), but also offer preferential response options to selected sets of recipients.

In the exemplary embodiment, the IOIs concern buying, selling, or otherwise transacting in one or more economic or financial instruments, such as stocks, bonds, commodities, options, derivatives, and so forth, from one or more specified or unspecified economic trading entities or parties, such as individual investors, individual brokers, brokerage firms, retail banks, investment banks, mutual-fund operators, etc. In some embodiments, the IOIs only concern blocks of stocks or other instruments meeting specific size restrictions, such as blocks of 10,000 or more shares of a stock, or blocks valued at $200,000 or more. Other embodiments may impose other size or value restrictions, such as blocks of 1000 or more, 2000 or more, 3000 or more, and so forth. In some embodiments, the IOIs may represent other forms of pre-trade or commercial data. For instance, some embodiments may include listings related to the sale or purchase of other forms of property, such as consumer goods or services, or real property.

Access devices 110 are coupled or couplable, for example, via an Internet Protocol (IP) network or other form of permanent, temporary, dedicated, shared wireless or wireline communication link to financial server 120.

Exemplary Financial Server

Server 120, which is generally representative of one or more servers for serving data in the form of webpages, or other markup language forms with associated applets, ActiveX controls, remote-invocation objects, or other related software and data structures to service clients of various "thicknesses." (The notion of "thickness" refers to the allocation or distribution of application logic or processing capability within a client-server architecture. A thin client has little or no application logic; so it depends primarily on the server for processing activities. In contrast, a thick or fat client does as much processing as possible and passes only data required for communications and archival storage to the server.) Some embodiments transmit data to and from the server using a version of the Financial Information Exchange (FIX) protocol. More particularly, server 120 includes a processor module 121, a memory module 122, a subscriber database 123, a search module 124, a financial database 124, and a trade-assistance module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores a subscriber database 123, a financial database 124, a search module 125, and trade-assistance software 126. (In some embodiments, the contents of memory 122, such as the software and/or data are distributed across or replicated across different machines and/or systems. For example, subscriber database 123, financial database 124, and one or more portions of trade assistance software 126 may be on one or more servers of a system such as the AutEx system, and one or more portions of trade assistance software 126 may in separate, though cooperative systems, such as TradeWeb system and/or the Thomson One Investment Management System, and/or Thomson Order Routing System. (Thomson, TradeWeb and Thomson One are trademarks of the Thomson Corporation.))

Subscriber database 123 generally includes subscriber-related data for controlling, administering, and managing pay-as-you-go or subscription-based or entitlement-based access to one or more databases or other features or functionality accessible via or provided by server 120. In the exemplary embodiment, subscriber database 123 includes a number of user data records or data structures, such as a representative data structure 1231. Data structure 1231 includes an identifier field or portion USERID that is uniquely associated with a corresponding user and that is logically associated with user authentication data AUTH, such as a password for authenticating the identity of the corresponding user, contact data CONT for contacting the corresponding user, and a set of IOI privilege values ANON, ACT, and WL. Privilege value ANON defines whether the corresponding user may respond to IOIs anonymously; privilege value ACT defines whether the corresponding user may access IOIs that have an associated online negotiation mechanism; and privilege value WL defines whether the corresponding user may access to an automated works larger negotiation mechanism. In some embodiment, data structure 1231 further includes a privilege value which defines whether the corresponding user may author IOIs that alter a recipient user's IOI privilege values for particular IOIs.

Financial database 124 includes one or more IOI data structures, such as a representative data structure 1241, based on submissions from users of access devices, such as access devices 110. In the exemplary embodiment, data structure 1241 includes an identifier field or portion, such as IOI-1, that is logically associated with one or more fields or portions, such as an author identification field A1, security identification field S1, quantity field Q1, price field P1, time stamp field T1, IOI duration field D1, recipient field R1, actionable field ACT, reserve data field RES, and IOI status field ST1.

Actionable field ACT includes data indicative or representative of whether selection of the associated IOI by appropriately privileged recipients will initiate an online negotiation mechanism. Reserve data field RES includes data indicative or representative of whether the IOI author (sender) has an interest in transacting for a larger quantity of the stock than indicated in quantity field Q1 as well as data indicative or representative of a reserve quantity or quantity range of stock and a reserve price or price range. In other embodiments, the reserve data may alternatively or additionally encompass one or more portions of a conventional IOI, such as the stock, quantity, price. Generally, data field RES may contain any data that the users wishes the system to be able to compare confidentially with the RES data for one or more other users of the system, with affirmative comparisons resulting in invitations to negotiate regarding related transactional opportunities.

Search module 125 includes one or more search engines and related user-interface components, for receiving and processing user queries against one or more of databases 110. In the exemplary embodiment, one or more search engines associated with search module 123 facilitate searching of IOI database 124 using a structured query language.

Trade-assistance software 126 includes a sell-side module 1261, a buy-side module 1262, and a works larger (or reserve order) module 1263. (Further description of the sell-side, buy-side, and works larger module and their exemplary operation is provided below with aid of FIGS. 2-9.)

Server 120 is communicatively coupled or couplable via a wireless or wireline communications network, such as a local-, wide-, private-, or virtual-private network, to one or more buy-side access devices represented generally by access device 130.

Buy-Side Access Device

Buy-side access device 130, which is generally representative of two or more access devices, includes a processor module 131, a memory module 132, a display 133, a keyboard 134, and a graphical pointer or selector (mouse) 135.

Specifically, processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI)138. In the exemplary embodiment, operating system 136 takes the form of a version of the Microsoft Windows operating system, and browser 137 takes the form of a version of Microsoft Internet Explorer; however, other embodiments use other commercial or non-commercial operating systems and/or browsers. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures (generally UIEs) from server 120.)

More specifically, graphical user interface 138 defines or provides one or more display regions, such as a query region 1381, a search-results region 1382, and a trade ticket region 1383. Although FIG. 1 shows query region 1381, results region 1382, and trade ticket region 1383 as being simultaneously displayed, some embodiments present them at separate times.

Query region 1381 is defined in memory and upon rendering includes one or more interactive control features (elements or widgets), such as input region 1381A and a query submission button 1381B. Input region 1381A accepts user input, such as company name or stock ticker symbol, defining a query for relevant IOI information from database 124. And submission button 1381B, upon activation, causes communication of the query to server 120 for processing.

Search-results region 1382 is also defined in memory and upon rendering displays IOI listings 1382A-1382C from IOI database 124. Additionally, one or more of the IOI listings, such as IOI listings 1382B and 1382C are associated with respective interactive control features 1382D and 1382E, which upon selection by a user initiate an online negotiation process between the sender of the corresponding IOI and the user. Initiation of the online negotiation process invokes display of trade ticket region 1383.

Trade ticket (negotiation) region 1383 includes an IOI listing region 1383A, an uptime region 1383B, an order details region 1383C, and a send command region 1383F. IOI listing region 1383A lists details of the IOI selected to invoke display of the trade ticket region. Uptime region 1383B lists remaining time until the corresponding IOI duration period expires. Order details region 1383C includes standard editable regions 1383D and privileged access regions 1383E. Standard editable regions 1383D allows a user to view, alter, and/or define the price, quantity, fill-kill feature, time-in-force data for the trade ticket. Privileged access region 1383E present interactive control features for enabling privileged or entitled recipients of the IOI to access an online negotiation process if the sender has associated such a process with an IOI, to anonymously submit the trade ticket to the IOI sender, and/or to input information indicative or representative of their interests in transacting for a larger quantity of the identified stock. Send command region 1383F includes one or more interactive features for initiating transmission of the trade ticket information defined in region 1383 to server 120.

Sell-side and buy-side order management systems (OMSs) 140 and 150 are operatively coupled to respective sell-side and buy-side access devices 110 and 130. In the exemplary embodiment, these OMSs are conventional and include conventional capabilities, such as the capability to communicate via FIX protocol, with other devices and/or systems. In some embodiments, the OMSs may include additional functionality, such as to automatically report trades in a third market, to drive special routing to an accepting trader to facilitate printing, and to send Execution Reports for specific executions directly to another OMS via FIX protocol. Also, in some embodiment, one or more portions of the order management system are incorporated into financial servers 120, or one or more portions of financial servers 120 are incorporated into order management systems 140 and/or 150.

Exemplary Methods of Operation

Figure 2:
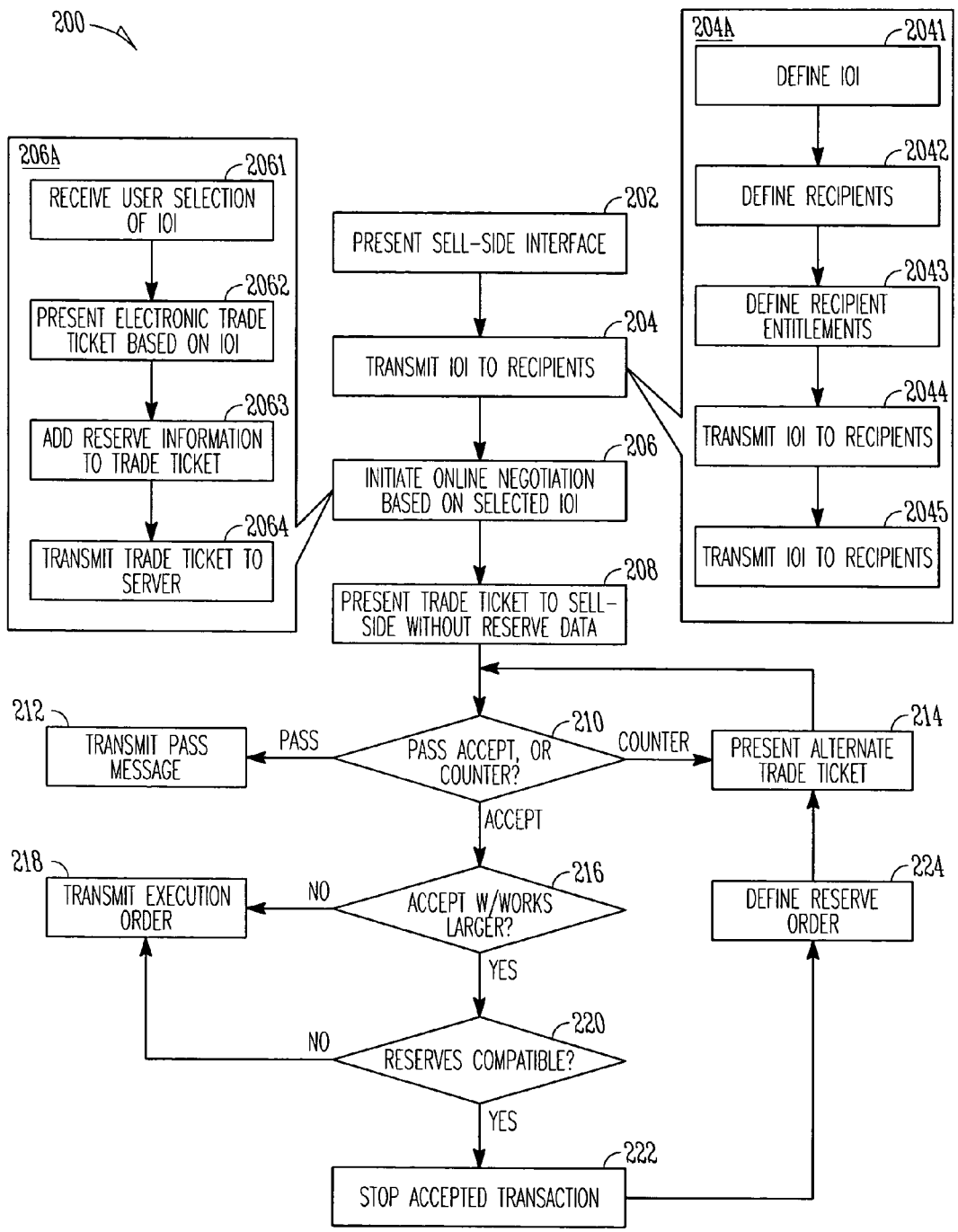
FIG. 2 is a flow chart 200 illustrating one or more exemplary methods of operating a financial-information system and corresponding to one or more embodiments of the present invention.

FIG. 2 shows a flow chart 200 of one or more exemplary methods of operating system 100. Flow chart 200 includes blocks 202-224, which are arranged and described in a serial sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Thus, the exemplary process flow applies to software, hardware, and firmware implementations.

Figure 3:
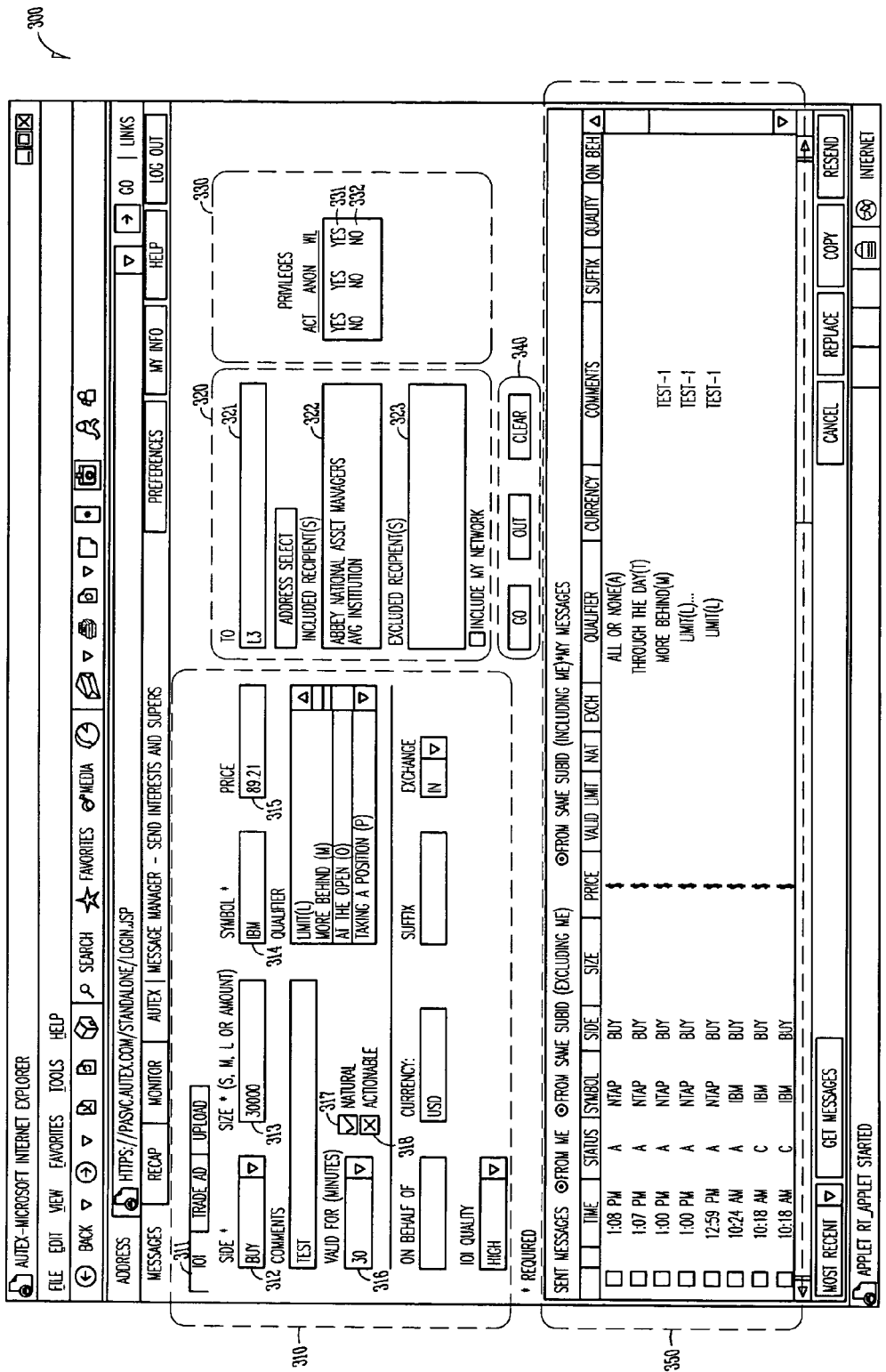
FIG. 3 is a facsimile of an exemplary graphical-user interface 300 corresponding to one or more embodiments of the present invention.

Block 202 entails presenting a sell-side user interface to one or more sell-side users. In the exemplary embodiment, this entails a user directing a browser in a sell-side access device, such as access device 110, to internet-protocol (IP) address corresponding to financial server 120 and then logging onto the system. Successful login results in one or more portions of a web-based interface, such as interface 116 in FIG. 1 being output from server 120, stored in memory 112, and displayed by access device 11. (FIG. 3 is described in detail below.)

Block 204 entails transmitting one or more IOIs. In the exemplary embodiment, this entails execution of the subprocess shown in block 204A, which includes process blocks 2041-2045. Block 2041 entails defining an IOI, such as stock, price, and/or quantity. For example, the IOI may define block trade terms, such as quantity of stock of 10,000 or more shares or a transaction value (quantity-price product) of $200,000 or greater. Other embodiments may use alternative block trade definitions and provide validation checks that prevent entry of non-block trade terms. Additionally, the exemplary embodiment provides options to define the IOI as a natural IOI and to define the IOI as an actionable IOI. Defining the IOI as a natural IOI entails checking or unchecking a check box or radio button which results in setting a binary value from one to zero or zero to one depending on the logic of the system. Similarly defining the IOI as an actionable IOI entails checking or unchecking a check box or radio button and thereby setting a binary value to indicate whether or not the IOI is associated with an online negotiation process.

Block 2042 entails defining a set of one or more recipients for the IOI. In the exemplary embodiment, this entails selecting a pull-down menu of trading partners and selecting one or more from the menu. However, some embodiments provide an input for manually entering one or more trade partner identifiers. Some embodiments may allow the IOI author to select an "anyone interested" option which would allow the system to send the IOI to any trading partners in its database who have confidentially pre-registered their interest in receiving IOIs regarding particular stock or other instruments.

Block 2043 entails defining response entitlements or privileges for each of the intended recipients. In the exemplary embodiment, each recipient has a set of three binary entitlement values: 1) a TBT value which indicates or determines whether the recipient may or may not initiate an online negotiation session with the sender of the IOI by selecting the IOI; 2) an anonymous value which indicates or determine whether the recipient may or may not respond to an IOI anonymously; and 3) a works larger (or reserve transaction) value which indicates or determines whether the recipient may or may not input an interest in trading a larger quantity of stock than indicated in the defined IOI. The default status of these entitlements is displayed for the sender upon selection or entry of a name or other identifier for a particular recipient.

FIG. 3 shows an exemplary interface 300 for defining the IOI, its recipients, and their response privileges, using a number of interactive control features, such as text input fields or pull down menus. In the exemplary embodiment, interface 300 includes a new-message generation region 310, a recipient-definition region 320, a privilege-definition region 330, a send command region 340, and a sent-messages region 350.

New-message generation region 310 includes: a message type control feature 311 for defining the new message as an indication of interest (IOI); a side-selection feature 312 for defining the new message as originating from the buy-side or sell-side; a size input feature 313 for categorizing a quantity of shares as small, medium, or large or for inputting a specific quantity of shares; a symbol input or select feature 314 for inputting or selecting an entity instrument identifier, such as a stock symbol; a price input or select feature 315 for inputting or selecting a price; a duration input or select feature 316 for inputting or selecting duration or life of the message; an IOI type input or selection feature 317, such as radio button or checkbox, for inputting or selecting the IOI type as a natural; and an IOI type input or selection feature 318 for defining the IOI also as being an actionable IOI (that is, an IOI having associated buy-side functionality for initiating and conducting an online negotiation.

Recipient definition region 320 includes an addressee input or selection feature 321 for inputting, selecting, or otherwise defining one o more recipients of the IOI message defined in region 310, a recipient listing portion 322 for listing the individual recipients, if the input at selection feature 321 identifies a set or list or two or more recipients. A listing portion 323 can be used to identify which of a set of recipients defined in a listing are to be excluded as recipients In the exemplary embodiment, region 320 provides one or more recipient selection features, such as pull down menus or address books or predefined distributions lists to facilitate identification of specific recipients.

Privilege-definition region 330 includes a listing of adjustable IOI response privileges for each IOI recipient identified in region 322. More specifically, each listed IOI recipient in region 322 is associated with a corresponding set of privilege selection features, such as privilege selection features 331 and 332, which not only display or otherwise indicate whether a given privilege is enabled (yes) or disabled (no), but also can be selected using a pointing device to enable a user, such as an IOI sender creating an IOI or modifying her IOI address book, to redefine the privileges for the listed recipients on a temporary (this IOI only) or permanent (all IOIs from this sender) basis. Exemplary privileges include privilege ACT to receive actionable IOIs , ANON privilege to respond anonymously to IOIs, and WL privilege to access an automated works larger mechanism. (In some embodiments, the privilege settings defined in this interface are associated with the message and recipients that are previously entitled or authorized to exercise one or more of the privileges associated with the message are enabled to exercise them on any message having them. Also, in some embodiment, recipients may be granted message-specific privileges that apply only to the associated message; in these instances, the message-privilege definitions override any global or default response privilege settings that may be in place.)

FIG. 4 shows an alternative interface 400 for defining the response privileges of a set of users, who may or may not be currently selected as recipients of a particular IOI. Interface 400 includes a company identifier region 410, a login ID region 420, a customer or recipient name region 430, and a privilege definition region 440. In this embodiment, company identifier region 410 identifies a company or other entity, for example, a buyside trading entity, that is associated with each of the listed names customer or recipient name region 430. In some embodiments, interface 400 is accessible via an administrator. However, in other embodiment, each subscriber to an online system, such as system 100, may access an interface 400 for enabling an IOI author to generally define default privileges of one or more IOI recipients whom the author may regularly or occasionally send In FIG. 2, blocks 2044 and 2045 show that after defining IOI response privileges, each defined IOI is then submitted to server 120 for storage in database 124 and then communicated to the recipients, more precisely their corresponding access devices. In some embodiments, the IOIs may be communicated directly from the IOI sender to the recipient, bypassing server 120.

Block 206, which executes after transmission of the IOI to the selected recipients, entails automatically initiating an online negotiation process based on a selected IOI. In the exemplary embodiment, this entails execution of the subprocess shown in block 206A, which includes process blocks 2061-2064.

Figure 5:
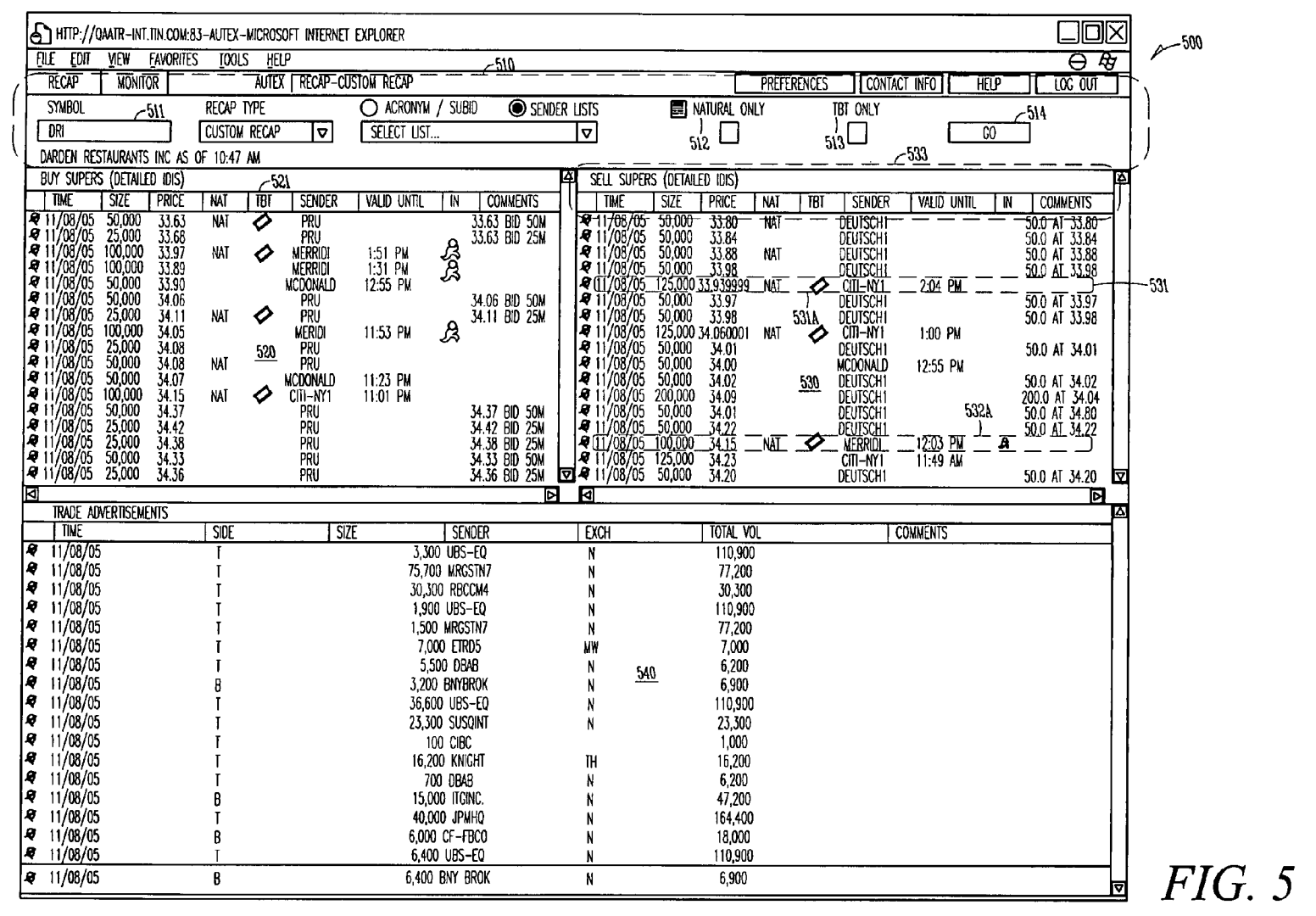

Block 2061 entails receiving a user selection of an IOI, after the user, for example, a buyside trader, uses a browser to couple to server 120, logs into the system using appropriate login credentials, and requests and receives a listing of relevant IOIs. FIG. 5 shows an exemplary interface 500 for submitting an IOI query and/or accessing an IOI listing based on the query. Interface 500, like others disclosed herein is suited for display on an access device, includes an interactive control or query region 510, a buy-super-IOI region 520, a sell-super-IOI region 530, and an advertised trade region 540.

Query (or recap-control) region 510 includes security symbol input region 511, a naturals filter command input region 512, an actionable filter command input region 513, a query-submission feature 514. Symbol input region 511 accepts stock or other financial instrument or company identification symbols, such as DRI—the ticker symbol for Darden Restaurants Incorporated. In some embodiments, region 511 takes the form of a pull-down menu listing all available ticker symbols or a predefined subset of symbols, for example, those most recently used and/or those from a user-defined watchlist.

Natural filter command region 512 accepts an input which directs that the search results only include natural 10Is. Actionable filter command input 513 accepts an input which directs that the search results only include IOIs that are actionable, that is associated with the automated negotiation process. Some embodiments may also include an "active IOI" filter to show only active IOIs, that is IOIs that have not expired based on their valid-until times. Also, in some embodiments two or more of the filter selection features may be in effect at the same time.

The command-submission feature 514, for example, a "go" button, is selectable to invoke submission of data from input region 511, 512, and 513 to server 120 or more precisely IOI database 124 (in FIG. 1.) In response, the server populates one or more of regions 520 and 530 with corresponding IOI data sets related to the content of input regions 511-513.

In regions 520 and 530, one or more of the IOIs listed are associated with a respective time stamp, a size indicator, a price indicator, a sender identifier, a presence indicator, valid until time indicator, an instant message presence indicator, and a comments string. Notably one or more of the IOI listings is also associated with an actionable indicator. For example, IOI listing 531 in region 530 includes an actionable indicator 531A, which resembles a golden ticket and which is selectable to initiate an online negotiation process.

In the exemplary embodiment, one or more of the IOIs, including at least one of the actionable IOIs, is associated with an instant message (IM) presence indicator indicating whether an entity associated with the IOI, or more precisely a computing device associated with an IP address associated with the entity, is present on a communications network. See, for example, IOI listing 532 and presence indicator 532A, which is selectable to invoke display of an instant messaging interface with a draft message based on the associated IOI listing.

Advertised trade region 540 lists data regarding one or more completed or advertised trades that are relevant to the symbol input data of field 511. Also, in some embodiments, each of the column headers in regions 520, 530, and 540 is selectable to initiate sorting of the IOI listings based on the data within the particular column, such as the TBT (actionable) columns 521 and 533 in respective regions 520 and 530. With selection of send button on the electronic ticket in FIG. 5, execution continues at block 2062 (in FIG. 2.)

Block 2062, which executes in response to the selection of an actionable indicator, such as indicator 531A, causes formation and presentation of a trade ticket interface or region, such as region 1383 in Figure 1,in a memory and on a display associated with buy-side access device 130. In the exemplary embodiment, this trade ticket is populated with data from the IOI, including the stock identifier, the price, quantity of shares, and so forth. In some embodiments, the access device includes software for generating the trade ticket locally rather than relying on server 120. Additionally, the trade ticket interface includes or excludes one or more interactive features based on the IOI response privileges associated with the IOI and/or the recipient of the IOI. For example, if the IOI recipient is not entitled to access works-larger functionality or respond anonymously, or if the selected IOI is not associated with the works-larger functionality or the anonymity feature, those aspects of the trade ticket interface are disabled or entirely omitted.

Figure 6:
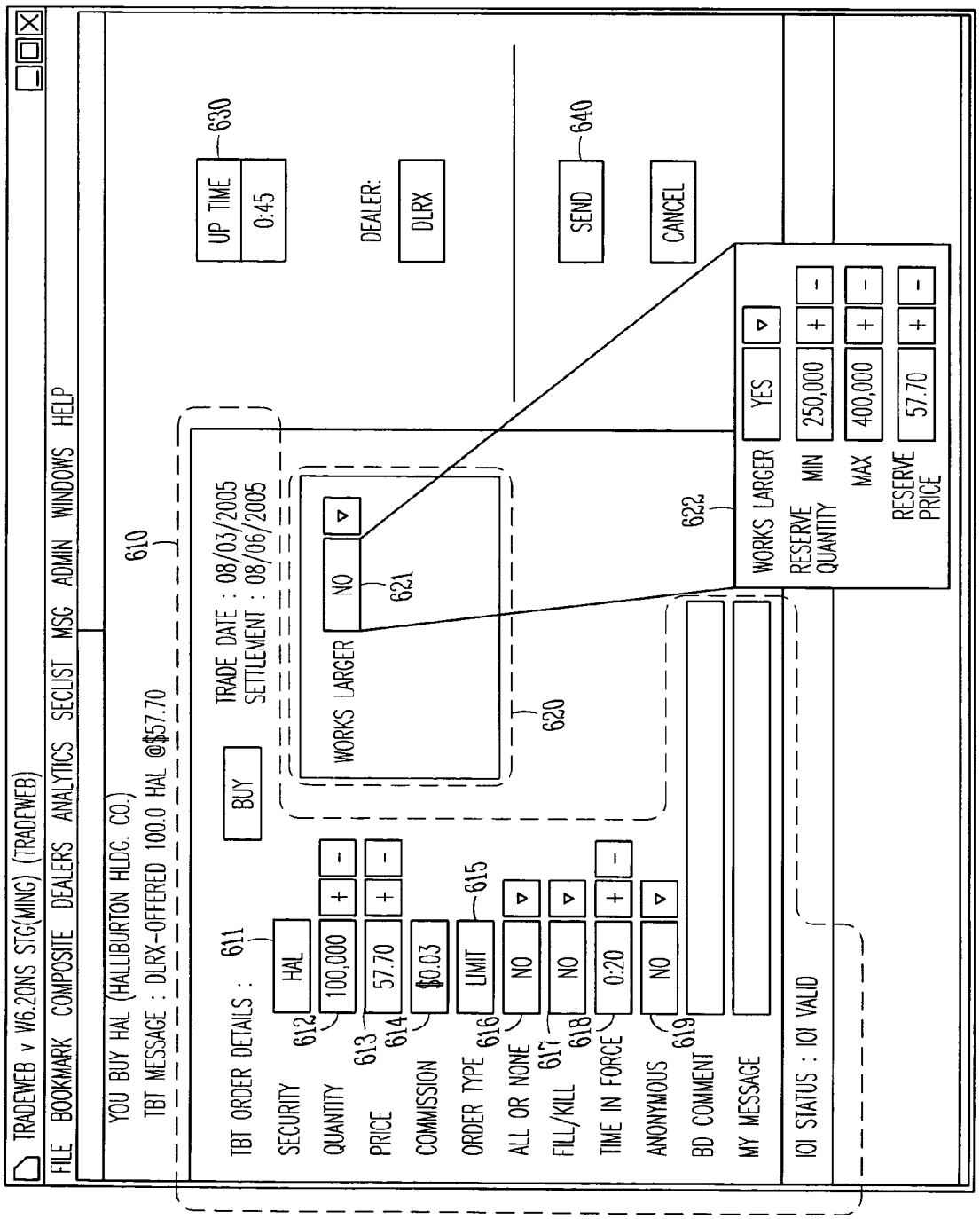
FIG. 6 is a facsimile of exemplary graphical user interface 600 corresponding to one or more embodiments of the present invention.

FIG. 6 shows an exemplary trade ticket interface 600, which can be used in place of trade ticket region 1383 in FIG. 1. In the exemplary embodiment, interface 600 includes an order details region 610, a works larger region 620, a an uptime region 630, and a send command region 640.

Order details region 610 includes a security identifier feature 611, a quantity feature 612, a price feature 613, a commission feature 614, order type feature 615, an all-or-none feature 616, a fill-kill feature 617, time-in-force features 618, and an anonymous feature 619.

Security identifier feature 611 identifies the particular security instrument identified in the IOI, using for example its ticker symbol or other identifier. Quantity feature 612 indicates number of shares and allow incrementation or decrementation of the quantity to a desired order amount. The exemplary embodiment notifies dealers (more generally IOI senders) of any variation from original IOI at order delivery.

Price feature 613 indicates share price and can be incremented or decremented to reflect desired price. Again, the exemplary embodiment will notify or otherwise alert IOI sender of any variation from original IOI at order delivery. Commission feature 614 indicates transactional fee paid by client; Defaults to value based on matrix provided by the sending dealer. Order type feature 615 indicates the type of order and in some embodiments allows the buyside user (more generally IOI recipient) to change the type of the order. Exemplary order types include limit order, more behind, at the open, taking a position.

All-or-none feature 616 denotes a limited price order that is to be executed in its entirety or not at all. Generally, this feature is used for non equity transactions, since prevailing equity trading rules prohibit such orders. However, some embodiments may allow such transactions between broker-dealers and their buy-side trading partners.

Fill-kill feature 617 can be enabled or activated by the recipient and operates as defined by recipient, for example, to prevent or restrict a recipient of the trade ticket from providing counter transactional terms. In some embodiment, selection of this feature may disable features, such as the ability to edit price or quantity, in the interface for any party receiving the order, in this context the IOI sender.

Time-in-force features 618 defines the duration of the trade ticket and allow incrementation or decrementation of a displayed time-in-force value. Anonymous feature 619, which indicates whether the trade ticket can be sent anonymously. This feature is controlled by the IOI sender and defined in the IOI itself or by an administrator.

Works larger region 620, which is presented if the IOI sender has entitled the recipient to access it, includes features 621 and 622. Feature 621 allows a recipient to indicate whether he has a desire to trade for a larger quantity of stock than the quantity specified in the IOI. If feature 621, which can take the form of a check box, radio button, or menu, is selected to indicate an affirmative desire to trade for a larger quantity of stock, feature 622 is displayed. Feature 622 enables a user to define a reserve quantity data and reserve pricing data.

Up time feature 630 indicates the amount of time left before the validity of the IOI expires.

Send command feature 640 includes a feature which is selectable cause transmission of signals representative of the trade ticket to server 120 and ultimately on to the corresponding IOI sender.

Block 2063 (in FIG. 2) entails adding reserve information to the trade ticket. In the exemplary embodiment, this entails a user selecting the works larger feature 618A (in FIG. 6) and changing it to "yes" to indicate the user's desire to transact for a larger quantity of stock than currently listed in the IOI and/or the trade ticket.

Block 2064 entails transmitting signals representative of the trade ticket to server 120. Exemplary execution then continues at block 208.

Block 208 presents the trade ticket to the sell-side entity, that is the IOI sender, without the reserve data maintained in confidence by the server. To this end, the exemplary embodiment presents a sell-side trade ticket interface on an access device such as access device 110 in FIG. 1.

Figure 7:
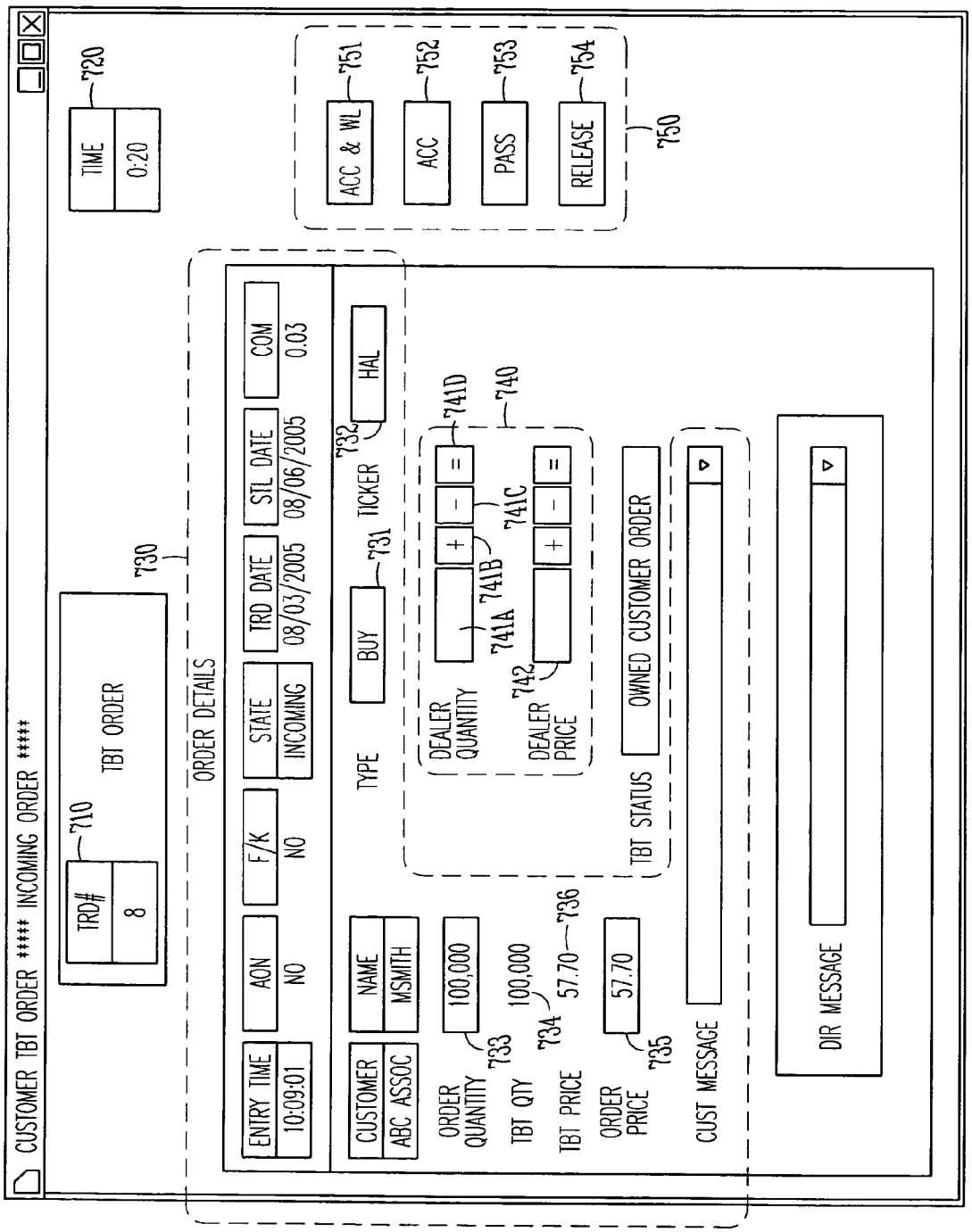
FIG. 7 is a facsimile of exemplary graphical user interface 700 corresponding to one or more embodiments of the present invention.

FIG. 7 shows an exemplary sell-side trade ticket interface 700, which augments interface 116 in FIG. 1. Interface 700 includes a trade ticket identifier 710, a time remaining indicator 720, an order detail region 730, a counter offer region 740, and a response transmission region 750.

Trade ticket identifier 710 provides an tracking or identification number for the trade ticket. Time remaining indicator 720 provides an indication of the remaining time to accept the terms of the trade ticket. After expiration of this time in the exemplary embodiment, there is no expectation that the sender of the trade ticket will honor an acceptance of the terms of the trade ticket.

Order detail region 730 provides a listing of the details of the order, including a trade action indicator 731, a stock identifier 732, a current quantity indicator 733, a previous quantity indicator 734, a current price indicator 735, and a previous price indicator 736. Trade action indicator 731 indicates whether the trade ticket is for a buy or sell from the perspective of the recipient of the trade ticket. Stock identifier 734 identifies a stock that is the subject of the trade ticket, for example using its ticker symbol.

Respective previous quantity and price indicators 734 and 735 indicate the quantity and price associated with the original IOI or the most recent terms proposed by the recipient of the trade ticket. In this embodiment the previous quantity and previous price indicators are presented in a different font than the current quantity and price indicator. For example, the previous quantity and price are presented in a red font on gray background, and the current quantity and price are presented in black front on white background.

Counter offer region 740 includes a dealer quantity region 741 and a dealer price region for enabling the dealer (or more generally) recipient of the trade ticket to input respective counter quantities and price. More particularly, dealer quantity region 741 includes a quantity field 741A, an add quantity button 741B, a minus quantity button 741C, and an equal quantity button 741D. Selection of add quantity button 741B results in presentation of a quantity in quantity field 741A which is greater than current quantity 733 by a preset amount, such as 100, 1000, or 10,000 shares. Repeated selection results in repeated incrementation of the quantity in field 741A. Similarly, selection of the minus quantity button causes presentation of an quantity in quantity field 741A which is less than the current quantity 733 by a present amount. Selection of equal quantity button 741D results in presentation of the current quantity 733 in field 741A. Dealer price region includes features for operating similarly with respect to current price indicator 735.

Response transmission region 750 includes an accept-and-work-larger command button 751, an accept command button 752, a pass command button 753, and a release command button 754. Accept-and-work-larger command button 751 is selectable to initiate communication of an acceptance of the terms of the trade ticket to the sender of the trade ticket and communication of works larger information to server 120. Accept command button 752 is selectable to initiate communication of an acceptance to the transaction terms.

Pass command button 753 is selectable by a user to initiate communication of a pass message to the sender of the trade ticket. And release command button 754 is selectable to release or unlock the status of the trade ticket for other users, for example other users in the same broker/dealer organization, to act on the trade ticket. Although not shown in the figure, the release command button previously appeared as "lock" or "mine" command button, which locked the status of the trade ticket, so that others users could only view it. Thus, command button 754 changes or toggles the state of the trade ticket after activation to reflect a locked or unlocked status of the trade ticket.

FIG. 2 shows that after presenting the trade ticket to the sell-side entity in block 208, execution continues at block 210.

Block 210 entails determining whether the sell-side entity passed, countered, or accepted the trade ticket provided by the buy-side recipient of the IOI. If the sell-side entity passed, by for example, selecting the pass option on the trade ticket interface, execution branches to block 212 which entails transmitting a pass message to the sender of the trade ticket, in this case the IOI recipient who defined the transaction terms. If the sell-side entity countered, execution branches to block 214 which entails transmitting and presenting an alternative trade ticket based on counter offer terms to the buy-side entity (or more generally the other trader.) (Note that the counter offer may be associated with reserve information from the sell-side entity.) From block 214 execution returns to block 210 to await the determination of whether the recipient of the counter offer has elected to pass, counter, or accept the terms presented in the alternate trade ticket.

Figure 8:
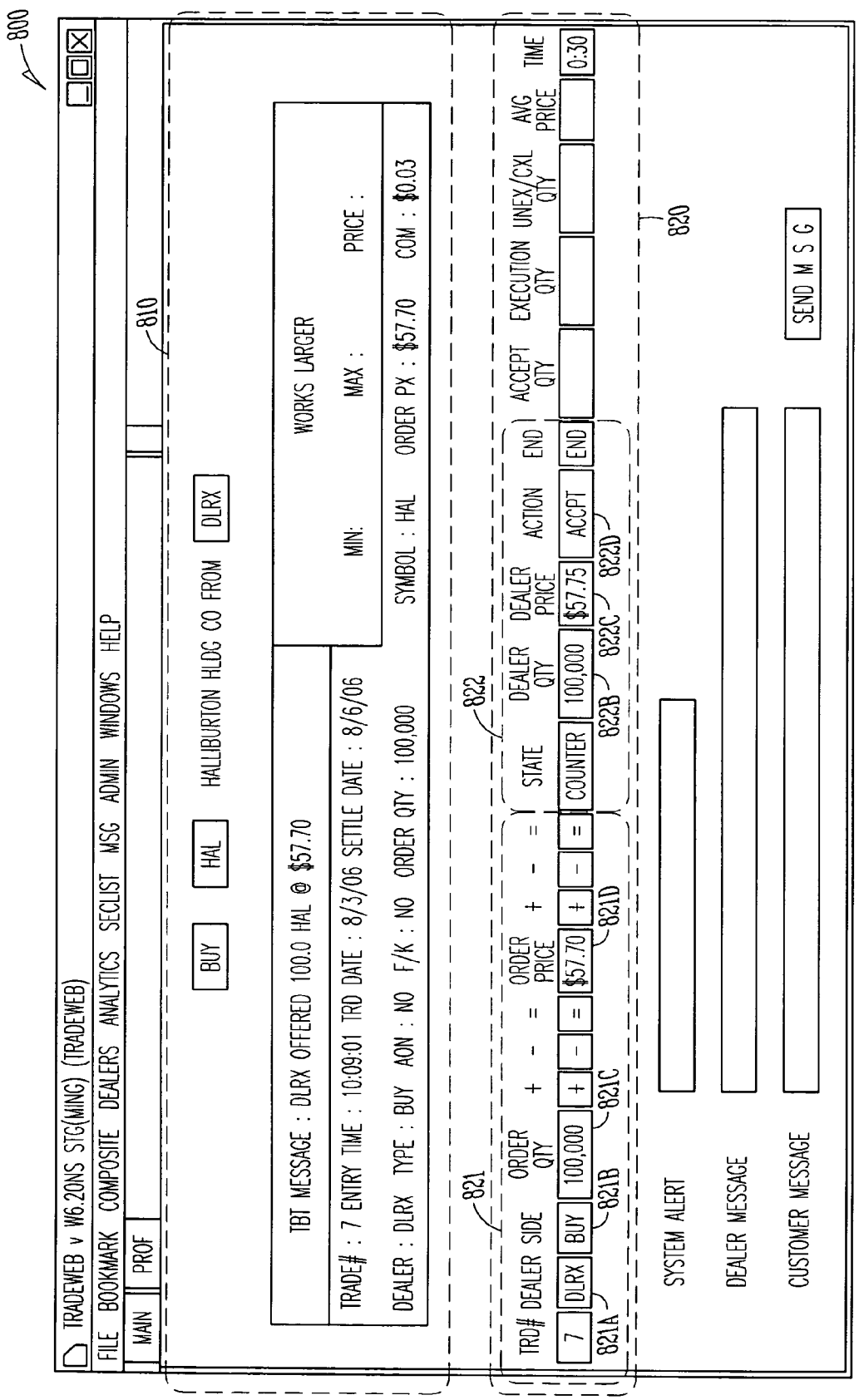
FIG. 8 is a facsimile of exemplary graphical user interface 800 corresponding to one or more embodiments of the present invention

FIG. 8 shows an exemplary sell-side interface 800 for viewing and/or interfacing with an alternative trade ticket that includes a counter offer from the sell-side. Interface 800 includes an original trade ticket summary region 810, a counter offer region 820, and post-trade region 830.

Original trade ticket summary region 810 lists original terms of the IOI as well as IOI response privileges. Counter offer region 820 includes previous proposed term region 821 and counter terms region 822. Previous proposed terms region 821 includes a dealer identifier 821A, a transaction side indicator 821B, a quantity indicator 821C, and a price indicator 821D.

Counter terms region 822 includes a counter indicator 822A, a counter quantity indicator/selector 822B, a counter price indicator 822C, an action indicator/selector 822D, and an end command 822E. Changing the price in region 821D toggles action indicator/selector 822D from the accept state to the counter state, with actuation or selection resulting in communication of the counter offer terms to the dealer. The font of the prince indicator 821D is red to indicate an inferior price offer and black to indicate a superior price offer. End command 822E enables the buyside user to terminate negotiations by communicating an appropriate message to the sell-side user.

Post-trade region 830 includes indicators for accepted quantity, execution quantity, and so forth.

In FIG. 2, the loop between blocks 210 and 214 can continue for as many cycles as the IOI remains valid and even beyond if the IOI sender is willing to entertain further inquiries from IOI recipient(s). If the IOI times out, the exemplary embodiment changes the visible character of the actionable indicator in all IOI listings that include the IOI (for example, from gold to gray), thereby signaling the actionable IOI has transitioned to an non-actionable IOI, for example a conventional natural or super IOI. In some embodiments, change in IOI status is signaled by displaying the IOI in an alternative region of the IOI listing screen or by change the color of all text associated with the IOI.

If at block 210, the current transaction terms are accepted, execution continues at block 216.

Block 216 entails determining whether the acceptance is made by a user that has indicated a desire to trade a larger quantity of the stock that is the subject of the acceptance. If the determination is that the acceptor does not want a larger transaction, based on the reserve information held in server 120, execution continues to block 218, which entails transmitting an execution order to complete the accepted transaction. However, if the determination is that the acceptor wants a larger transaction, execution branches to block 220.

Block 220 determines whether the reserve information for the buy-side and sell-side traders is compatible. To this end, the exemplary embodiment first determines whether the non-accepting trader has indicated a desire to work larger based on the stored reserve information for this trader. If the non-accepting trader has indicated a desire to works larger, then the exemplary embodiment determines whether the reserve values are compatible.

The reserve values are deemed compatible if the dealer's price and dealer's quantity is compatible with the customer's reserve price and reserve quantity. For example, some embodiments deem the reserve prices as compatible if and only if the dealer's price is equal to or greater than the customer's (that is, the IOI recipient's) reserve price. And some embodiments deem the reserve quantities as being compatible if there is an intersection or overlap of the dealer's and the IOI recipient's reserve quantity ranges.

If either of the reserve pricing or the reserve quantities are incompatible, the system deems the works larger interests as being incompatible and execution branches to block 218 to transmit the prior accepted transaction and thus allow execution and printing. However, if both the reserve pricing and the reserve quantities are determined to be compatible, execution continues at block 222.

Block 222 entails putting the accepted transaction in a pending status. In the exemplary embodiment, the pending status is denoted works larger pending, and means that the dealer is guaranteeing the accepted terms, pending the results of ensuing "works larger" negotiation. Thus, if the works larger negotiation fails to culminate into the desired larger transaction, the prior accepted transaction will be executed.

Block 224 defines a reserve order based on the reserve quantity and reserve pricing terms of the sell-side and buy-side traders. To this end, the exemplary embodiment defines the reserve order has having a quantity equal to maximum quantity within the quantity ranges of both the sell and buy side traders? and a price equal to the IOI sender's (dealer's) reserve price. Some embodiments may set the reserve order price at the minimum price that satisfies both the sell-side and buyside reserve price constraints. Execution returns to block 214 to present an alternative trade ticket (based on the reserve order terms) to the non-accepting party, after which execution continues at block 210 to determine whether the non-accepting user will pass, counter, or accept the proposed works larger transaction.

Alternative Sell-Side Interface

Figure 9:
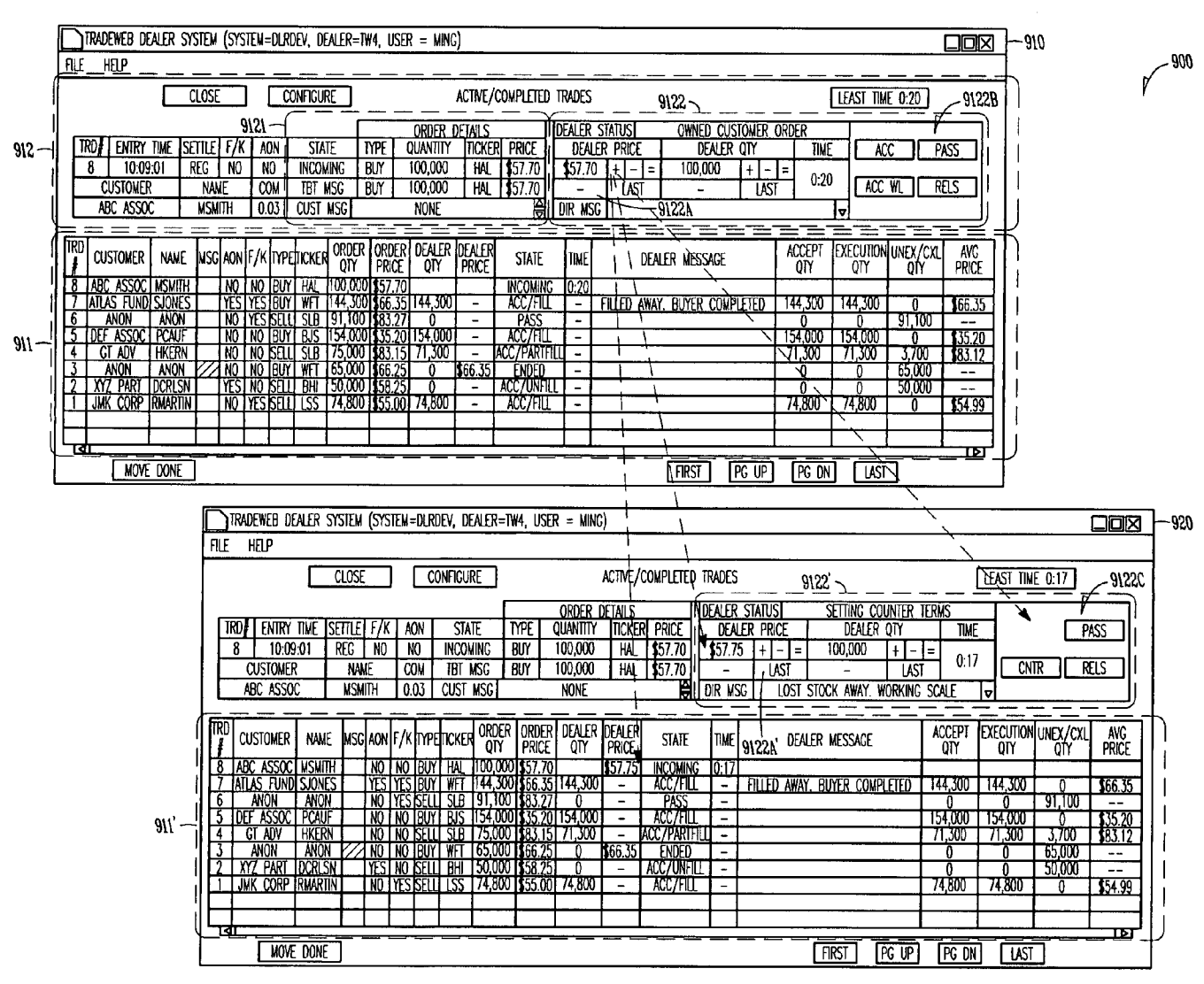

FIG. 9 shows an alternative sell-side interface 900 that may be used a part of or in place of one or more portions of interface 116 in FIG. 1 or interface 700 in FIG. 7 to manage a set of active or pending stock transactions. Interface 900 includes display regions 910 and 920.

Display region 910 includes a transaction log region 911 and a transaction detail region 912. Transaction log region 911 lists status information for a number of incoming, pending, or ended stock transactions. For each stock transaction, region 910 lists a customer name, a trader name, the status of one or more IOI response privileges, the buy-or-sell type of the transaction, a stock identifier for the transaction, an order quantity, an order price, a dealer quantity, a dealer price, a transaction status indicator, an uptime indicator, and a message. The stock transactions are listed for example in the order of the least available response time. Notably, region 911 also lists one or more of the customer and trader names as being anonymous (Anon). Each of the listed stock transactions is selectable, with selection causing display of further detailed information in transaction detail region 912. For example, selection of transaction 8, which is denoted by a change in the font or background color of listed stock transaction, results in display of the details of transaction 8 in region 912.

Region 912 includes a term comparison region 9121 and a response region 9122. Comparison region 9121 lists original IOI terms, such as transaction type, quantity, stock identifier, and price adjacent corresponding incoming or pending transaction terms. In the exemplary embodiment, the original IOI terms and the incoming pending terms are presented in different fonts. For example, the original terms are presented as red type on a gray background, and the incoming or pending terms are presented as black type on a white background.

Action region 9122 includes pricing change features 9122A and response command features 9122B. Pricing change features 9122A and response command features 9122B includes features analogous to those of interface 700. Notably, activation of a pricing change feature to increase or decrease the current price in the pending or current transaction terms results in presentation of display region 920. Region 920 includes the updated price in region 911 (denoted 911') and in region 9122A'. Additionally, region 920 includes an alternative set of response command features 9122C, which differs from response command features 9122C by omission of acceptance features and inclusion of a counter command feature (CNTR).

CONCLUSION

In furtherance of the art, the present inventors have devised and presented herein systems, methods, interfaces, and software that enhance the ability of financial-information systems, such as trader matching systems, to facilitate trades.

One exemplary system provides an indication of interest (IOI) which is associated with an online negotiation mechanism that enables users to negotiate trades within the IOI messaging system.

Ultimately, one of more of these or other embodiments promise improved efficiency and convenience of online interactions not only for financial trading partners and others in the financial-services industry, but also for those in any private, public, and commercial domain where rapid or convenient online communication is desirable.

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

The invention claimed is:

1. A computer-implemented method for routing indications of interest using a server system, including one or more computers each having at least one processor and an associated memory, wherein the server system is capable of communication with a dealer computer and a client computer, the method comprising:
   receiving, at the server system, information from the dealer computer related to a potential order for a stock;
   transmitting, from the server system, an indication of interest (IOI) using the information received from the dealer computer which comprises a set of transaction terms, including a stock identifier, a price, and a quantity;
   receiving, at the server system, a selection of a control feature associated with the IOI; and
   automatically initiating an online negotiation process at the server system based upon the information in the IOI, in response to the selection of the control feature associated with the IOI.

2. The method of claim 1:
   wherein the control feature is an input item capable of selection at the client computer and causing transmission of an indication to the server system to generate a trade ticket including information representative of a set of transaction terms.

3. The method of claim 2, further comprising, at the server system, communicating the trade ticket to the dealer computer, and wherein communicating the trade ticket, includes causing the presentation of graphical representations of a set of response options on a display associated with the dealer computer, the set of response options including:
   a first option to communicate signals representative of an acceptance of the trade ticket; and
   a second option to communicate signals representative of an acceptance of the trade ticket and a desire to transact a larger quantity of stock than the quantity of the IOI.

4. The method of claim 2, further comprising:
   receiving a set of access values from the dealer computer, wherein at least one of the access values affects eligibility of a client to access the trade ticket.

5. The method of claim 4, wherein at least another of the access values affects whether the client, using the client computer, can anonymously communicate signals representative of an acceptance in response to the signals representative of the trade ticket.

6. The method of claim 4, wherein at least another of the access values affects whether signals representative of the trade ticket are presented together with signals representative of a user selectable option to signify an interest in a larger quantity of stock than associated with the trade ticket.

7. The method of claim 1, further comprising communicating signals representative of a trade ticket to an order management system, in response to communication of signals representative of an acceptance of terms presented during the online negotiation process.

* * * * *